Patented June 16, 1953

2,642,413

UNITED STATES PATENT OFFICE 2,642,413

POLYMERS OF PHOSPHONIC ACID DIAMIDES WITH UREAS

Harry W. Coover, Jr., Kingsport, Tenn., assignor to Eastman Kodak Company, Rochester, N. Y., a corporation of New Jersey No Drawing. Application December 7, 1951, Serial No. 260,589

12 Claims. (Cl. 260—77.5)

This invention relates to resinous condensation products of organo-phosphonic acid diamides and urea, thiourea or N-alkyl substituted compounds thereof, and to a process for the preparation of such condensation products.

It is known that organo-phosphonic acid diamides are relatively stable compounds. For example, alpha, beta-unsaturated phosphonic acid compounds including their amides have been found to be essentially unpolymerizable by themselves in the presence of peroxide-type polymerization catalysts. I have now found, however, that such compounds can be condensed with urea, thiourea or N-alkyl substituted ureas and thioureas to resinous products by simply heating together certain proportions of these compounds to temperatures substantially above their melting points. The resinous products so obtained are characterized by having relatively high softening points, by good solubility in volatile commercial solvents and by having many valuable commercial applications as noninflammable materials for molding and film-forming purposes, but more particularly as fiber-forming materials having good affinity for various organic dyes of the cellulose-acetate type.

The exact chemical structure of the new class of resinous compounds of the invention is not known. However, available evidence indicates that they are linear polymers containing in the polymer chain the fundamental recurring structural group:

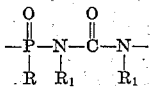

wherein R is a monovalent hydrocarbon radical containing not more than 7 carbon atoms such as an alkyl group of from 1 to 4 carbon (e. g. methyl, ethyl, propyl, isopropyl, butyl, etc. groups), an aryl group (e. g. phenyl or tolyl groups), a benzyl group, a cyclohexyl group and an alkenyl group containing from 3 to 7 carbon atoms (e. g. allyl, methallyl, propene, pentene, hexene, etc. groups) and $R_1$ is an atom of hydrogen or an alkyl group containing from 1 to 4 carbon atoms. Under certain conditions some cross linking may occur with the alkenyl-phosphonic acid diamides, in which case the polymers obtained differ somewhat in properties from those prepared under conditions where no cross linking takes place.

It is, accordingly, an object of my invention to provide a new class of resinous condensation products of organo-phosphonic acid diamides and urea, thiourea or N-alkyl substituted ureas and thioureas. Another object is to provide resinous condensation products suitable for preparing fibers of good strength and dyeability. Another object is to provide a process for preparing the same. Other objects will become apparent from the specification and examples.

In accordance with the invention, I react from 50 to 95 mol per cent of an organo-phosphonic acid diamide having the general formula:

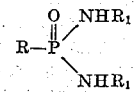

wherein R and $R_1$ have the previously defined meanings, with from 50 to 5 mol per cent of urea, thiourea or N-alkyl substituents thereof, wherein the alkyl group contains from 1 to 4 carbon atoms, at a temperature of from 150° to 400° C., preferably from 200° to 350° C., until the desired resinous product is obtained. The condensation reaction at this point is substantially complete, but somewhat higher molecular weight products can be obtained by continuing the heating at reduced pressure. The products produced by the added heating step under reduced pressure are tougher and more particularly useful for fiber-forming purposes. Suitable reactants include phosphonic acid diamides (phosphondiamides) such as methanephosphonic acid diamide, ethanephosphonic acid diamide, n-propanephosphonic acid diamide, isopropanephosphonic acid diamide, n-butanephosphonic acid diamide, phenylphosphonic acid diamide, p-tolylphosphonic acid diamide and the N-alkyl and N,N'-dialkyl derivatives thereof, and ureas such as urea, thiourea and the N-alkyl and N,N'-dialkyl derivatives of urea and thiourea.

The condensation reaction can be carried out at normal or higher or lower than atmospheric pressures. The reaction can also be carried out, if desired, by heating a solution or a suspension of the reactants in an inert medium. As the condensation proceeds, ammonia or an amine corresponding to the $R_1$ groups is given off and the clear melt gradually becomes viscous. To obtain higher molecular weight polymers, it is advantageous to complete the condensation by heating under reduced pressure. The lower molecular weight materials tend to be brittle and glass-like, whereas those of higher molecular weight are considerably tougher. Mixed polymers can also be prepared from two or more of the organo-phosphonic diamides by condensing the mixtures thereof with one or more suitable urea compounds. Similarly, two or more ureas can be condensed with one or more of the organo-phosphonic acid diamides. However, whether the condensations concern simple or mixed polymers, for satisfactory results the urea compounds cannot be present in the reaction mixture in larger amount than a total of 50 mol per cent, since they will not homocondense under the conditions of the condensation and the excess remains in the polymer as difficultly removable monomeric urea compounds.

The intermediate organo-phosphonic acid diamides employed for preparing the resinous products of the invention can be prepared by reacting the desired organo-phosphonic acid with thionyl chloride or phosphorus pentachloride to obtain the corresponding dichloride, R—PO(Cl)$_2$, which is then reacted with ammonia or a monosubstituted alkylamine to give the corresponding diamide, R—PO(NHR$_1$)$_2$. The step for preparing the acid chlorides can conveniently be carried out in solvents such as benzene, toluene or a hydrocarbon. The reaction can also be carried out in the absence of such inert solvent. While either thionyl chloride or phosphorus pentachloride will react with the phosphonic acids at room temperature, the reaction can be greatly speeded up by carrying it out at about 70° C. In the step of aminating the above prepared dichlorides, the reactor must be surrounded by a cooling bath. The reaction is substantially over when the addition of the ammonia or amine is complete. The excess of ammonia or amine is then removed by distillation, the mixture remaining as a residue diluted with ether or some other inert solvent and filtered to remove amine hydrochloride. The filtrate is then freed from the solvent and the residue distilled or crystallized, depending on the properties of the particular organo-phosphonic acid diamide. The amination reaction can also be carried out by dissolving the amine in an inert solvent such as ether, chloroform, etc. In some cases, the simpler phosphonic acid diamides can be prepared by reacting the desired phosphonic acid dichloride with aqueous ammonia. In general, the amination is conducted at 0° C. or below. The simple diamides are usually high melting solids, while the N-alkyl substituted diamides are low melting solids to viscous oils. The alkenyl phosphonic acid diamides can also be prepared according to U. S. Patent 2,382,309, dated August 14, 1945. Suitable amines for the amination reaction with the various organo-phosphonic acid dischlorides to give the diamide intermediates employed in the invention include methylamine, ethylamine, n-propylamine, isopropylamine, and the various monobutylamines.

The following examples will serve further to illustrate the new class of resinous compounds of the invention, and the manner of preparing the same.

*Example 1*

16 g. (0.10 mol) of phenylphosphonic acid diamide and 6 g. (0.10 mol) of urea were mixed together and the mixture heated to 200° C. At this temperature, ammonia was evolved and a clear melt was formed. The temperature was gradually raised to 250° C. and held there for a period of 5 hours. Upon cooling the mixture, a clear, hard polymer was obtained. The polymer was soluble in dimethyl formamide and would not support combustion. Analysis for nitrogen indicated that the product was a 1:1 polymer of phenyl phosphonic acid diamide and urea. It had a softening point above 200° C.

*Example 2*

A mixture of 14 g. (0.10 mol) of butanephosphonic acid diamide and 1 g. (0.011 mol) of N,N'-dimethyl urea was slowly heated to 250° C. As the temperature was raised, a clear melt formed and methylamine and ammonia were evolved. The condensation was continued at this temperature for 10 hours. At the end of this time no further evolution of ammonia or methylamine was observed. Upon cooling the melt, a clear, hard polymer was formed. The polymer was soluble in acetone and had excellent molding properties.

*Example 3*

10 g. (0.05 mol) of N,N'-dimethyl phenylphosphonic acid diamide and 1 g. (0.017 mol) of urea were mixed together and heated at 250° C. for 2 hours and the temperature was then raised to 300° C. for an additional 3 hours of heating. At the end of this time no further evolution of ammonia or methylamine was observed. Upon cooling, a clear, hard, moldable polymer was obtained. The polymer was soluble in acetonitrile and had a softening point above 150° C.

*Example 4*

A mixture of 2 g. (0.021 mol) of methanephosphonic acid diamide, 5 g. (0.032 mol) of phenylphosphone diamide and 2 g. (0.026 mol) of thiourea was heated at 210° C. for 2 hours. The temperature was then raised to 250° C. for an additional 4 hours. At the end of this time no further evolution of ammonia was observed. Upon cooling, a clear, hard polymer was obtained. The polymer was soluble in dimethyl acetamide and had good molding properties. It had a softening point above 200° C. and would not support combustion.

Other mixed polymers having generally similar properties are obtained by varying the proportions of the reactants. Thus, in the above example, the methanephosphonic diamide can vary from about 5–90 mol per cent, the phenylphosphonic acid diamide can vary from about 45–5 mol percent and the thiourea can vary from about 50–5 mol per cent. Urea or N-alkyl or N,N'-dialkyl ureas and thioureas can be substituted for the thiourea in the above example.

*Example 5*

10 g. (0.064 mol) of phenylphosphonic acid diamide and 1 g. (0.017 mol) of urea were mixed together and heated at 250° C. for 3 hours. The clear melt was then heated at 300° C. under 1 mm. pressure for an additional 6 hours. The resulting polymer was colorless and soluble in dimethyl formamide. Fibers of excellent physical properties and good dyeability were drawn from a melt of the polymer. The fibers had a softening point above 200° C. and would not support combustion.

By following the procedures set forth in the preceding examples, generally similar condensation polymers can be prepared from the other mentioned organo-phosphonic acid diamides and urea compounds, in proportions wherein the urea compounds do not exceed 50 mol per cent of the total reactants. All of the polymers of the invention are soluble in one or more volatile solvents such as acetone, acetonitrile, dimethyl formamide, dimethyl acetamide, etc. Such solutions or dopes can be coated on film-forming surfaces to give continuous structure tough sheets or films, or employed as overcoating materials, or used as spinning solutions from which fibers can be prepared by wet or dry spinning processes. As previously indicated, the polymers of the invention can also be spun to fibers directly from their melts. Such solutions, dopes and melts, as well as molding compositions containing one or more of the polymers of the invention, can be modified by incorporation therein of suitable fillers, pigments, dyes, plasticizers, and the like, before, during or after the condensations.

What I claim is:

1. A process for preparing a resinous condensation polymer characterized by containing in the polymer chain the recurring structural group:

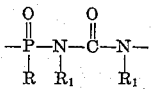

wherein R represents a hydrocarbon radical containing not more than 7 carbon atoms and $R_1$ represents a member selected from the group consisting of an atom of hydrogen and an alkyl group containing from 1 to 4 carbon atoms, comprising heating a mixture comprising from 50 to 95 mol per cent of an organo-phosphonic acid diamide having the general formula:

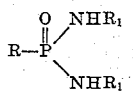

wherein R and $R_1$ have the above meanings, and from 50 to 5 mol per cent of a compound selected from the group consisting of urea, thiourea, an N-alkyl urea, an N-alkyl thiourea, an N,N'-dialkyl urea and an N,N'-dialkyl thiourea wherein each alkyl group contains from 1 to 4 carbon atoms, at a temperature of from 150° to 400° C., until condensation of the reactants is substantially complete.

2. A process for preparing a resinous condensation product of phenylphosphonic acid diamide and urea comprising heating a mixture comprising from 50 to 95 mol per cent of phenylphosphonic acid diamide and from 50 to 5 mol per cent of urea, at a temperature of from 200° to 350° C., until the condensation of the reactants is substantially complete.

3. A process for preparing a resinous condensation product of n-butanephosphonic acid diamide and N,N'-dimethyl urea comprising heating a mixture comprising from 50 to 95 mol per cent of n-butanephosphonic acid diamide and from 50 to 5 mol per cent of N,N'-dimethyl urea, at a temperature of from 200° to 350° C., until the condensation of the reactants is substantially complete.

4. A process for preparing a resinous condensation product of N,N'-dimethyl phenylphosphonic acid diamide and urea comprising heating a mixture comprising from 50 to 95 mol per cent of N,N'-dimethyl phenylphosphonic acid diamide and from 50 to 5 mol per cent of urea, at a temperature of from 200° to 350° C., until the condensation of the reactants is substantially complete.

5. A process for preparing a resinous condensation product of methanephosphonic acid diamide, phenylphosphonic acid diamide and thiourea comprising heating a mixture comprising from 5 to 90 mol per cent of methanephosphonic acide diamide, from 45 to 5 mol per cent of phenylphosphonic acid diamide and from 50 to 5 mol per cent of thiourea, at a temperature of from 200° to 350° C., until the condensation of the reactants is substantially complete.

6. A process for preparing a resinous condensation product of phenylphosphonic acid diamide and urea comprising heating a mixture comprising from 50 to 95 mol per cent of phenylphosphonic acid diamide and from 50 to 5 mol per cent of urea, at a temperature of from 200° to 350° C. and at normal atmospheric pressure, until the condensation of the reactants is substantially complete, and then continuing the heating under reduced pressure until the molecular weight of the polymer is substantially increased.

7. The products obtained by the process of claim 1.

8. The products obtained by the process of claim 2.

9. The products obtained by the process of claim 3.

10. The products obtained by the process of claim 4.

11. The products obtained by the process of claim 5.

12. The products obtained by the process of claim 6.

HARRY W. COOVER, Jr.

References Cited in the file of this patent

UNITED STATES PATENTS

| Number | Name | Date |
|---|---|---|
| 2,366,129 | Rust | Dec. 26, 1944 |
| 2,382,309 | Hamilton | Aug. 14, 1945 |